US010046301B2

(12) United States Patent
Quinn et al.

(10) Patent No.: US 10,046,301 B2
(45) Date of Patent: Aug. 14, 2018

(54) APPLIANCE FOR MADE-IN-HOME PERSONAL CARE PRODUCTS AND HOUSEHOLD CLEANERS

(71) Applicants: Reed Quinn, Orem, UT (US); Spencer Quinn, Orem, UT (US)

(72) Inventors: Reed Quinn, Orem, UT (US); Spencer Quinn, Orem, UT (US)

(*) Notice: Subject to any disclaimer, the term of this patent is extended or adjusted under 35 U.S.C. 154(b) by 0 days.

(21) Appl. No.: 15/353,489

(22) Filed: Nov. 16, 2016

(65) Prior Publication Data

US 2017/0136439 A1 May 18, 2017

Related U.S. Application Data

(60) Provisional application No. 62/255,966, filed on Nov. 16, 2015.

(51) Int. Cl.
*B01J 19/18* (2006.01)
*B01J 19/00* (2006.01)

(52) U.S. Cl.
CPC ........... *B01J 19/18* (2013.01); *B01J 19/0006* (2013.01); *B01J 19/0066* (2013.01); *B01J 2219/00051* (2013.01); *B01J 2219/00168* (2013.01); *B01J 2219/00177* (2013.01)

(58) Field of Classification Search
CPC ..... B01J 19/18; B01J 19/0006; B01J 19/0066
See application file for complete search history.

(56) References Cited

U.S. PATENT DOCUMENTS

| 3,804,297 A | * | 4/1974 | Jurjans | D06F 39/022 222/54 |
| 2003/0198125 A1 | * | 10/2003 | Linsen | B01F 13/1066 366/152.1 |
| 2004/0164096 A1 | * | 8/2004 | Engel | A45D 34/04 222/137 |
| 2006/0124196 A1 | * | 6/2006 | Bartholomew | G07F 11/165 141/100 |
| 2007/0142256 A1 | * | 6/2007 | Lang | C11D 17/041 510/141 |
| 2011/0171155 A1 | * | 7/2011 | Federle | C12N 9/90 424/70.24 |
| 2012/0279990 A1 | * | 11/2012 | Werner | B05B 11/3083 222/132 |
| 2015/0021256 A1 | * | 1/2015 | Luther | B01D 29/21 210/233 |

\* cited by examiner

*Primary Examiner* — Sean E Conley
(74) *Attorney, Agent, or Firm* — Dodd Call Black, PLLC; Dustin Call

(57) ABSTRACT

An appliance for producing a personal care product. The appliance includes a reaction chamber configured to receive one or more ingredients of a personal care product. The appliance also includes a cartridge, wherein the cartridge holds at least one of the one or more ingredients of the personal care product. The appliance further includes an output port configured to allow removal of the personal care product from the reaction chamber.

11 Claims, 2 Drawing Sheets

APPLIANCE FOR MADE-IN-HOME PERSONAL CARE PRODUCTS AND HOUSEHOLD CLEANERS

CROSS-REFERENCE TO RELATED APPLICATIONS

This application claims the benefit of and priority to U.S. Provisional Patent Application Ser. No. 62/255,966 filed on Nov. 16, 2016, which application is incorporated herein by reference in its entirety.

BACKGROUND OF THE INVENTION

The recent trend toward made-in-home has been driven by both the proliferation and decreasing cost of many prototyping technologies and by consumers increasing awareness and distrust of mass-produced products.

The increasing desire of consumers to understand what is in a product and how it is made are largely driven by increased awareness of and concern about existing mass-produced products':
  Carbon foot print
  Environmental impact
  Country of origin
  Social impact
  Harmful or wasteful packaging
  Excessive shipping
  Harmful ingredients (non-organic, non-bio-degradable, potential allergens or carcinogens etc.)

The general perception is that local-made/homemade products have superior quality, less environmental impact, and are safer because they have fewer unknowns. Distrust and decreasing cost of made-at-home technologies are not the only drivers of this trend. There are also complementary trends toward increased customization, entrepreneurship, self-sufficiency and early adoption.

Current products on the market that are designed to enable consumers to manufacture at home often fall short of consumers' expectations. Using 3D printers as the standard example of the current made-in-home appliance, the following is a summary of common problems faced by these types of products.
  High Cost—The cost of both 3D printers and the resins and hot melt plastics they use are often many times more expensive than the materials used in their mass-produced counterparts. Similarly, the manufacturing cost are less efficient leading to much higher cost.
  Complicated to Operate—3D printers often require additional hardware, software and training to operate.
  Low Capacity—Generally the output of a 3D printer is limited to a single product at a time. In addition, the higher the resolution (product quality) the slower the print speed. The inverse relationship of speed and quality in 3D printing is extremely limiting.
  Low Quality—Even with good 3D printers, the size of the printing bed, the print resolution, the limited types, colors and versatility of material often results in an inferior product when compared with a production quality unit.
  Inconvenient Customization—To use the full range of capabilities of a 3D printer you need to have the software systems, and experience to 3D model. There are some limited libraries of designs but even modest customization of these designs like making them bigger or smaller often requires 3D modeling software. The 3D Printer also tend to be limited to a single material. This is perhaps the single largest limiting factor. The number of products that can be produced with a single material and a single manufacturing process are extremely small when compared with products produced with multiple materials and multiple processes.
  Impractical—Most consumers currently view 3D printers as a novelty item rather than a functional appliance. They may use them for an occasional hobby project but rarely if ever for the same task twice. It might be fun and interesting to print your own custom chess set rather than buy a higher quality less expensive version but it is not something that you will do more than once.

Until 3D printing gets fast enough, cheap enough and versatile enough to compete, in quality, and cost and accessibility with mass-produced product, it will never be a seriously considered alternative for those products.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes an appliance for producing a personal care product. The appliance includes a reaction chamber configured to receive one or more ingredients of a personal care product. The appliance also includes a cartridge, wherein the cartridge holds at least one of the one or more ingredients of the personal care product. The appliance further includes an output port configured to allow removal of the personal care product from the reaction chamber.

Another example embodiment includes an appliance for producing a personal care product. The appliance includes a reaction chamber configured to receive one or more ingredients of a personal care product and a sensor configured to determine the conditions in the reaction chamber. The appliance also includes a cartridge, wherein the cartridge holds at least one of the one or more ingredients of the personal care product and an interface, the interface configured to receive the cartridge and allow the ingredient in the cartridge to move into the reaction chamber. The appliance further includes an output port configured to allow removal of the personal care product from the reaction chamber.

Another example embodiment includes an appliance for producing a personal care product. The appliance includes a reaction chamber configured to receive one or more ingredients of a personal care product and a sensor configured to determine the conditions in the reaction chamber. The appliance also includes a cartridge, wherein the cartridge holds at least one of the one or more ingredients of the personal care product and an interface, the interface configured to receive the cartridge and allow the ingredient in the cartridge to move into the reaction chamber. The appliance further includes an output port configured to allow removal of the personal care product from the reaction chamber. The appliance additionally includes a control board.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
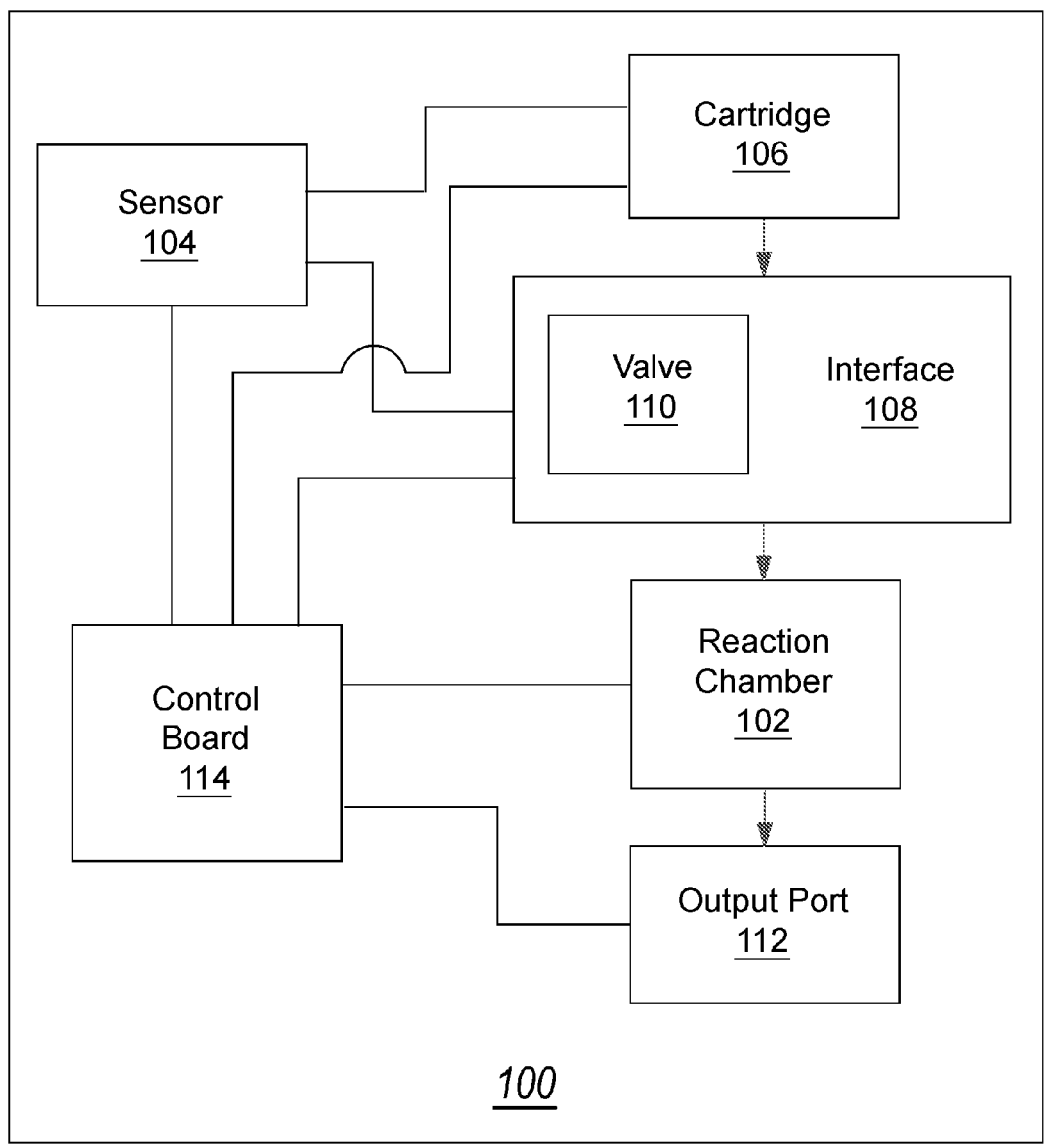
FIG. 1 illustrates a block diagram of an example of an appliance.

FIG. 1 illustrates a block diagram of an example of an appliance 100. The appliance 100 allows a user to produce made-in-home personal care products and household cleaners (as used herein "personal care product" includes both personal care products and household cleaners). The appliance 100 is an efficient, low-cost, made-in-home, alternative to mass-produced consumer products.

The appliance 100 offers at least the following seven advantages over store bought products or other appliances:
1. Produces a consumable output—I.e., the personal care product is something that is used up in preforming its function and needs to be made repeatedly. Thus, the user is saved from repeatedly buying the final product;
2. Produces a product that consumers already use frequently—allows a user to make-at-home the personal care product and as needed;
3. Generates many highly customized outputs from relatively few ingredients—the fewer ingredients the cheaper, more user-friendly, and less complex and costly the appliance must be;
4. Uses readily available and inexpensive inputs—the few simple ingredients are available from many pre-existing and geographically decentralized (local) suppliers and the consumer will be familiar with these ingredients and regularly use them for other things;
5. Employs relatively simple manufacturing processes—in general, mass-produced products with complex manufacturing processes have high economies of scale whereas products with simple manufacturing processes are easier to create competitive made-in-home substitutes;
6. Easy to operate—the appliance is self-contained and intuitive without the need for additional hardware, software or special training; and
7. Inexpensive—Both inexpensive to purchase and to operate Made-in-home products do have some cost advantage over some mass-produced products. Mass produced products may have relatively efficient and low manufacturing costs but relatively high costs to consumer because of shipping, packaging, retail margins, branding, advertising, lack of competition, lack of supply or high willingness to pay. Made-in-Home production can compete most effectively with products that have simple, low economies of scale manufacturing processes and high shipping, packaging, retail margins, branding or advertising costs. The appliance 100 meets all of these criteria.

Soap, cleaners and other personal care products are consumed in preforming their function, and have a large existing user base. There are tens of thousands of types of these products, customized by intended use, audience, strength, fragrance, etc. and most are made from few generic ingredients. These products also tend to have very simple manufacturing process (mostly measuring, mixing and letting the ingredients react with each other) which help keep the cost and complexity of the appliance and the output very low.

The appliance 100 could be used to produce a wide variety of hand soap, laundry soap, dish soap, shampoo, conditioner, body wash, antiseptic and all kinds of detergents and house-hold cleaners. A similar or even the same device could also be used to produce other household liquids, sprays, foams, gels etc. that require the measuring mixing and reacting of ingredients. These could include things like lotions, shaving creams, balms, ointments, rubs, aftershaves, perfumes, moisturizers, deodorants, and other personal care and household products.

FIG. 1 shows that the appliance 100 can include a reaction chamber 102. The reaction chamber 102 allows the ingredients to be combined or otherwise processed to produce the personal care product. For example, the reaction chamber 102 can include a stir bar (either mechanical or magnetic) or other mechanism for mixing the ingredients within the reaction chamber 102. Additionally or alternatively, the reaction chamber 102 can include a heater, an ultrasonic bath or any other desired mechanism for facilitating mixing or chemical reactions. Further, one of skill in the art will appreciate that the size, shape or materials of the mixing chamber 102 can be used to promote the desired reaction.

In addition, the reaction chamber 102 may have a mechanism for extruding the mixture out of the chamber. Further, the reaction chamber 102 may be self-cleaning. I.e., the extruding mechanism may be able to force all of the personal care product from the reaction chamber 102 (or a sufficiently high percentage) such that the reaction chamber 102 may be considered clean for future creation of personal care product.

One example of a reaction chamber 102 includes a durable and flexible pouch with valves at opposite ends and one or more rollers. As the rollers squeeze together leaving a smaller gap and roll up and down the length of the pouch they mix the ingredients as they are forced together through the gap between the rollers inside the chamber.

FIG. 1 also shows that the appliance 100 can include one or more sensors 104. The sensors 104 allow for determining the conditions in the reaction chamber 102. For example, the sensors 104 can determine viscosity, temperature, pH, or other physical or chemical attributes of the personal care product. For example, in the example above, the rollers could also include sensors that could used to measure viscosity.

FIG. 1 further shows that the appliance 100 can include one or more cartridges 106. The cartridges 106 are a container or hopper that allow a user to view store and/or switch ingredients for the personal care product. That is, the cartridge 106 is configured to hold one or more ingredients for the personal care product. The cartridge 106 can be changed by the user to produce different personal care product. For example, a cartridge 106 holding one scent can be changed for a cartridge 106 holding a different scent. The cartridge can be loaded with an ingredient by the user or can come preloaded, as desired.

As used in the specification and the claims, the phrase "configured to" denotes an actual state of configuration that fundamentally ties recited elements to the physical characteristics of the recited structure. That is, the phrase "configured to" denotes that the element is structurally capable of performing the cited element but need not necessarily be doing so at any given time. Thus, the phrase "configured to" reaches well beyond merely describing functional language or intended use since the phrase actively recites an actual state of configuration.

One of skill in the art will appreciate that the user need not use all of the ingredient within the cartridge before removing. That is, the user may use a portion of the ingredient within the cartridge and remove it from the appliance 100. Therefore, the cartridge 106 may be closable to preserve unused ingredients or a user can refill the cartridge 106. Likewise, the cartridge can include a window, markings or some other identified that allows the user to both identify the ingredient and how much remains within the cartridge 106.

One of skill in the art will appreciate that the cartridge 106 can also be used to prepare the ingredient for use. For example, the cartridge 106 can include a filter or distiller for preparing water for use in the personal care product. Likewise, the cartridge 106 can be used to heat or cool an ingredient if needed. For example, if the cartridge 106 contains waxes or oils, the cartridge 106 can be used to heat the wax or oil for use.

FIG. 1 additionally shows that the appliance 100 can include an interface 108. The interface allows a user to attach the cartridge 106 or multiple cartridges. That is, the interface 108 is where ingredients for the personal care product transition to other parts of the appliance (e.g., the reaction chamber 102) for mixing or other processing. One of skill in the art will appreciate that the interface 108 may be purely mechanical (i.e., just an attachment point for the cartridge 106 relative to the appliance 100), can include a gate or other device which can control the passage of ingredient from the cartridge 106 or can include an electrical connection. For example, the electrical connection can allow for the appliance 100 to read the contents of the cartridge 106, provide power to the cartridge 106 to allow the cartridge 106 to discharge ingredient, control discharge of the ingredient from the cartridge 106 or perform any other desired function. E.g., the interface can include an electrical connection that allows a valve on the cartridge 106 to open, preventing the ingredient from leaking when the cartridge 106 is not in use.

One of skill in the art will appreciate that the interface 108 can be configured to let ingredients into the mixture sequentially or according to a timer or other mechanism. E.g., the interface 108 can allow distilled water to enter the appliance, then other ingredients then essential oils only after the mixture has reached a certain temperature. For example, the interface 108 can have an opening that rotates or moves as needed to allow entry of proper ingredients.

FIG. 1 moreover shows that the appliance 100 can include one or more valves 110. The valves are attached to the interface 108 and are configured to measure and regulate the flow of ingredients from the cartridge 106 to the reaction chamber 102. That is, the valves are used to measure the flow of ingredients into the reaction chamber.

FIG. 1 also shows that the appliance 100 can include an output port 112. The output port 112 can allow the final product, or an intermediate product, to be removed from the reaction chamber 102. For example, the output port 112 can include a valve or other opening that opens to allow the reaction chamber 102 to be evacuated. The output port 112 can be part of the interface 108 or can be a separate mechanism. For example, in the embodiment used as an example previously, a valve can be placed on one end of the pouch. The valve can be opened and the rollers could squeeze all the way together acting like a squeegee rolling down the length of the pouch and cleaning all of the product out of the reaction chamber, and preparing the pouch for a new batch. The output port 112 can be connected to a desired container. For example, the container can be a bottle for liquid soap, a mold for bar soap, a lidded Container for balm etc. The output port 112 can identify the type and size of some containers, and can be used to dispense final ingredients (like exfoliate) that do not need to react with other ingredients or ingredients (like scents or effervescent) that might be damaged by the reaction with other raw ingredients. I.e., the output port 112 can receive not only the final product from the reaction chamber 102, the output can also receive final ingredients from a cartridge 106.

FIG. 1 also shows that the appliance 100 can include a control board 114. The control board 114 can control other portions of the appliance 100. For example, the control board 114 can control the interface 108, and the valves 110 therein, to control the amount of ingredient flowing from the cartridge 106 to the reaction chamber 104. As another example, the control board 114 can track the type and amount of inputs and outputs of the appliance 100. Likewise, the control board 114 can monitor the reaction occurring in the reaction chamber 102 via the sensors 104 and the dispensing of the product from the output port 112.

One of skill in the art will appreciate that the control board 114 can be used to received commands from a user. For example, the control panel may be wi-fi enabled, Bluetooth enabled, include a user interface or receive user commands in any other desired manner. For example, a user Interface may be used to turn on and off the appliance, control the appliance, adjust batch settings (including batch size, reaction time, ratio of ingredients, batch viscosity, amount of color, amount of fragrance, amount of abrasives, amount of active ingredient, etc.). Likewise, a user interface can allow a user to download, create, modify, save, share, recall, or upload batch settings (i.e. recipes), compile, save batch settings, or order ingredients for selected recipes. In addition, the user may allow linking with online accounts, websites, payment processors etc. Moreover, the user interface can allow the user to unlock hoppers, identify new ingredients and ingredient interface position or show batch status.

Figure 2:
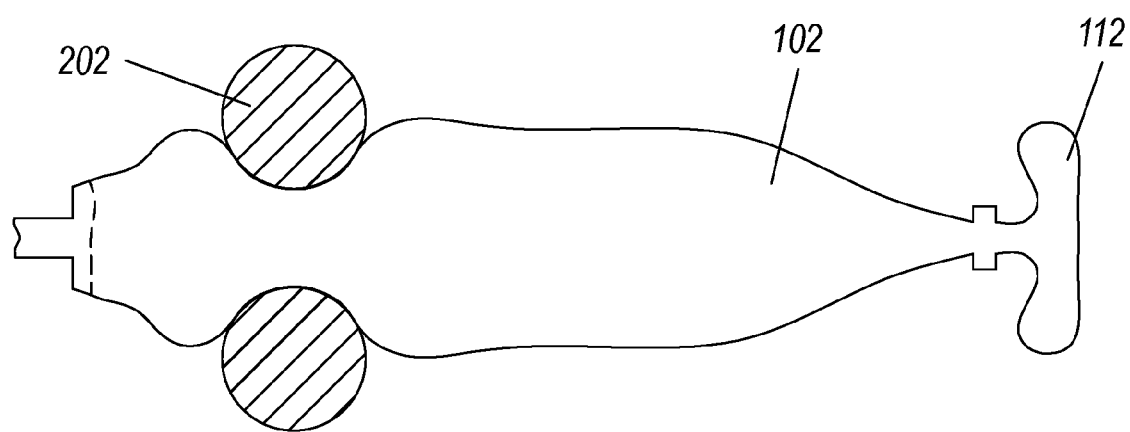
FIG. 2 illustrates a cross-section of one possible embodiment of the appliance for producing a personal care product.

FIG. 2 illustrates a cross-section of one possible embodiment of the appliance 100 for producing a personal care product. Specifically, FIG. 2 shows that the reaction chamber 102 can be shaped as a flexible pouch, with a pair of rollers 202 both mix the personal care product and can be used to measure properties of the personal care product, such as the viscosity. The reaction chamber 102 includes an output port 112 that can be opened to allow the personal care product to be extracted.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An appliance for producing a personal care product, the appliance comprising:

a reaction chamber configured to receive one or more ingredients of the personal care product, the reaction chamber including:
   a heater;
   a mechanism for mixing ingredients; and
   an extruding mechanism;
a sensor configured to determine a condition in the reaction chamber, the sensor configured to determine a pH of the personal care product;
a cartridge, wherein the cartridge holds at least one of the one or more ingredients of the personal care product;
an interface, the interface configured to receive the cartridge and allow the at least one of the one or more ingredients of the personal care product in the cartridge to move into the reaction chamber; and
an output port configured to allow removal of the personal care product from the reaction chamber.

2. The appliance of claim 1, wherein the sensor is configured to determine the viscosity of the personal care product.

3. The appliance of claim 1, wherein the sensor is configured to determine the temperature of the personal care product.

4. An appliance for producing a personal care product, the appliance comprising:
a reaction chamber configured to receive one or more ingredients of the personal care product, the reaction chamber including:
   a heater;
   a mechanism for mixing ingredients; and
   an extruding mechanism, wherein the extruding mechanism includes one or more rollers;
a sensor configured to determine a condition in the reaction chamber, the sensor configured to determine a pH of the personal care product;
a cartridge, wherein the cartridge:
   holds at least one of the one or more ingredients of the personal care product; and
   includes a filter;
an interface, the interface configured to receive the cartridge and allow the at least one of the one or more ingredients of the personal care product in the cartridge to move into the reaction chamber;
an output port configured to allow removal of the personal care product from the reaction chamber; and
a control board, wherein the control board includes a user interface configured to receive one or more commands from a user.

5. The appliance of claim 4, wherein the interface includes one or more valves.

6. The appliance of claim 4, wherein the control board tracks at least one of:
   a type of an input into the appliance;
   an amount of an input into the appliance;
   a type of an output from the appliance; or
   an amount of an output from the appliance.

7. The appliance of claim 4, wherein the control board is configured to adjust one or more batch settings.

8. The appliance of claim 7, wherein the one or more batch settings include at least one of:
   a reaction time;
   a ratio of ingredients;
   a batch viscosity;
   an amount of fragrance;
   an amount of abrasives; or
   an amount of active ingredient.

9. The appliance of claim 4, wherein the user interface allows the user to do at least one of:
   input the one or more commands;
   control a batch setting;
   download a batch setting;
   create a batch setting;
   save a batch setting;
   share a batch setting;
   upload a batch setting;
   save a batch setting;
   order an ingredient for a selected batch setting;
   link with an online account;
   link with a website;
   link with a payment processor;
   unlock the cartridge; or
   show a batch status.

10. The appliance of claim 7, wherein the one or more batch settings include a batch size.

11. The appliance of claim 7, wherein the one or more batch settings include an amount of color.

* * * * *